United States Patent Office 3,192,241
Patented June 29, 1965

3,192,241
TRANSESTERIFICATION REACTION OF ORTHO-
SILICATES WITH POLYHYDRIC PHENOLS
David Samuel Petrie Roebuck, Newport, England,
assignor to Monsanto Chemicals Limited, London,
England, a British company
No Drawing. Filed Mar. 13, 1958, Ser. No. 721,090
Claims priority, application Great Britain, Mar. 15, 1957,
8,651/57
20 Claims. (Cl. 260—448.8)

This invention relates to certain novel organic polysilicates and their preparation by a transesterification procedure.

Organic orthosilicates have been prepared in the past by suitable esterification methods, as well as condensed products formed by the further condensation of orthosilicates in the presence of limited amounts of water, and certain of these materials have been made use of in various applications. Silicates that are relatively stable, such as for instance tetraaryl orthosilicates and tetraalkyl orthosilicates in which the esterifying groups are higher alkyl groups, have for example been used as heat-exchange fluids and in other ways. Lower alkyl silicates such as ethyl orthosilicate are in a rather special category in that they are very easily hydrolysed by water to give silica as the end product, and in fact ethyl silicates are employed in certain applications which make use of this property.

The aryl and higher alkyl orthosilicates and their condensation products provide a range of materials of differing properties, and these can be controlled to some extent, for instance by varying the extent of condensation in the case of condensed bodies. However, there is a limit to the way in which materials of required properties or known structures can be obtained in this manner, particularly in the case of condensed products where there are many opportunities for cross-linking and other side reactions to occur between silicate molecules.

It has now been found that certain novel polysilicates of controlled structure, many of which are liquids useful as functional fluids, can be obtained by a transesterification reaction in which an organic silicate is treated with a phenol containing at least two hydroxyl groups. During the transesterification a hydroxyl-containing by-product is formed from a group split from the silicate starting material, and the result is a polysilicate in which molecules of the initial silicate have become linked together by means of residues derived from the phenol containing at least two hydroxyl groups, for instance a residue such as —O.C$_6$H$_4$.O—.

The novel organic polysilicate of the invention is accordingly one containing as a link between two silicon atoms a residue derived from a phenol having at least two hydroxyl groups.

The process of the invention is one for the preparation of a polysilicate in which an organic silicate starting material is treated with a phenol containing at least two hydroxyl groups so that transesterification with resultant cross-linking occurs.

The novel polysilicates of the invention have excellent heat stability, and those members which are liquid at the desired operating temperature can be employed as functional fluids, for instance as a hydraulic fluid in a system for the transmission of power and as a heat-exchange fluid in a heat transfer system. Particularly valuable in heat transfer systems are those polysilicates which are liquid at ordinary atmospheric temperatures, although it is also practical to use those bodies which although solid at lower temperatures are liquid at the required operating temperatures. Some of the solid polysilicates do not melt; however, since these possess good heat stability and rubber-like properties they have potential uses as rubbers or as binding agents for example.

The novel polysilicate of the invention is preferably an aryl polysilicate, for instance a phenyl polysilicate containing as a link between two silicon atoms a residue derived from the phenol, and when prepared by the process of the invention is therefore obtained from an aryl silicate (for instance a phenyl silicate) starting material. Preferably the silicate starting material is a tetraaryl orthosilicate, although aralkyl orthosilicates, higher alkyl orthosilicates and mixed aryl/higher alkyl orthosilicates can also be used; the aryl, aralkyl and higher alkyl groups can contain substituents that do not interfere with the course of the reaction. Examples of specific silicate starting materials are tetraphenyl, tetratolyl, tetraoctyl, tetradecyl and tetradodecyl orthosilicates. If desired there can be used an orthosilicate having an organo-oxy group replaced by an organo group, as in phenyl triphenoxysilane for example.

The phenol containing at least two hydroxyl groups is preferably a dihydric one although phenols containing more hydroxyl groups can be used if a polysilicate having a rather higher degree of cross-linking is desired. Suitable dihydric phenols are hydroquinone, resorcinol, catechol and tert.-butylcatechols, and examples of trihydric phenols are pyrogallol, hydroxyquinol and phloroglucinol.

Specific novel polysilicates are described in the examples below, and it will be apparent from the above paragraphs that in general the preferred polysilicates are ones having aryloxy groups (for instance phenoxy groups) attached to silicon atoms, with a residue derived from a dihydric phenol linking two of the silicon atoms.

The process of the invention can be carried out in any convenient way, for instance by merely heating the components together in the presence of an esterification catalyst, for instance an acid such as for example p-toluene-sulphonic acid. The presence of a catalyst is however not essential, and the reaction will proceed under the action of heat alone. It is normally desirable to remove the hydroxyl-containing by-product (an alcohol or a phenol) as it is formed, and this can easily be arranged; for instance it can be distilled off as the transesterification reaction proceeds.

Good results are obtained when 1 mol. of the organic silicate starting material is employed for each hydroxyl group present in the phenol starting material, although both higher and lower proportions of the silicate can be used if desired. For example instead of 1 mol. of a dihydric phenol being reacted with 2 mols. of the silicate the ratio can be increased to 1 mol. of the phenol to between 2 and 10 mols. of the silicate; excellent results are obtained with between 2 and 8 mols. of the silicate. Alternatively 1 mol. of the phenol can for instance be reacted with from 1 to 2 mols. of the silicate. With the higher proportions of the silicate the resulting product tends to be a liquid rather than a solid, although the silicate/phenol ratio is not the only consideration which affects this point, and also important are the reaction conditions employed in the transesterification reaction when the polysilicates are made using this procedure. Thus a solid rather than a liquid polysilicate is more likely to be formed if a higher temperature or a longer reaction time are used, or if a more active esterification catalyst is employed. In practice there is no difficulty in choosing conditions so as to obtain a polysilicate having the desired properties.

In one preferred embodiment a dihydric phenol such as for instance hydroquinone is used with an orthosilicate such as for instance tetraphenyl orthosilicate and the transesterification reaction is allowed to proceed until an equilibrium is reached (since normally during the reaction a certain amount of rearrangement within the polysilicate molecules will occur).

The invention is illustrated by the following examples.

Example 1

This example describes the production of a liquid polysilicate by the transesterification of tetraphenyl orthosilicate with hydroquinone.

50 grams of tetraphenyl orthosilicate were mixed with 15 grams of hydroquinone in a round bottomed flask fitted with a fractionating column, and the mixture was heated under reflux conditions at a bath temperature of 300° C. As the transesterification proceeded by-product phenol was formed, and this was distilled off through the column and collected. 20 grams of phenol were collected in this way.

There remained in the flask 45 grams of a substantially linear liquid polysilicate which contained phenoxysilicon groups linked together by means of hydroquinone residues.

Example 2

This example describes the production of a solid polysilicate from tetraphenyl orthosilicate and hydroquinone.

50 grams of tetraphenyl orthosilicate, 15 grams of hydroquinone and 1.4 grams of p-toluenesulphonic acid were heated under an atmosphere of nitrogen to a bath temperature of 300° C. in a round bottomed flask fitted with a fractionating column. By-product phenol distilled over; towards the end of the transesterification a vacuum was applied to the system to assist in the distillation of final traces of the phenol. A total of 25.5 grams of phenol were collected in this way.

As the reaction proceeded the contents of the flask gradually solidified, and there were left finally 40 grams of a rubbery infusible polysilicate similar to that of the previous example except that it was more highly condensed.

Example 3

This example described the production of a liquid polysilicate from tetraphenyl orthosilicate and hydroquinone.

20 grams of tetraphenyl orthosilicate (0.05 mol.) and 2.75 grams of hydroquinone (0.025 mol.) were reacted together as described in Example 1 at reflux temperature and the by-product phenol was distilled off over a three-hour period. At the end of this time any remaining traces of phenol were removed under reduced pressure, and there was thus obtained 17.9 grams of a viscous but mobile liquid polysilicate.

Example 4

This example again describes a phenyl polysilicate cross-linked with residues derived from hydroquinone but in this instance the product was a solid.

20 grams of tetraphenyl orthosilicate (0.05 mol.) and 5.5 grams of hydroquinone (0.05 mol.) were reacted together as described in Example 1, 6.9 grams of by-product phenol being collected during the course of the reaction.

The resulting polysilicate was a greasy, gelatinous solid. It was insoluble in cyclohexane and in methanol but was partially soluble in ethyl ether and in benzene. The material remaining after extraction with ether was a rubber-like, colourless solid.

Example 5

This example describes the production of a polysilicate derived from tetraphenyl silicate which was a mobile liquid at elevated temperatures showing signs of crystallisation at low temperatures.

22 grams (0.05 mol. of orthosilicate) of a crude sample of tetraphenyl orthosilicate (prepared by the reaction of phenol with silicon tetrachloride and containing 10% by weight of phenol and 0.1% by weight of hydrogen chloride), were mixed with 0.7 gram (0.0063 mol.) of hydroquinone and reacted together as described in Example 1. During the reaction approximately 3.5 grams of phenol were distilled off, and at the same time the hydrogen chloride was removed from the reaction mixture.

Example 6

This example describes a polysilicate obtained by cross-linking tetraphenyl orthosilicate with resorcinol.

20 grams of tetraphenyl orthosilicate (0.05 mol.) were mixed with 5.5 grams of resorcinol (0.05 mol.) and reacted together as described in Example 1 except that in addition to the fractionating column the flask was fitted with a stirrer and this was in use during the experiment whilst the by-product phenol was being distilled off. The stirrer was then removed and the reaction mass was heated to 300° C. at 5 mm. of mercury pressure in order to remove the last traces of phenol and any unreacted tetraphenyl silicate. The resulting polysilicate weighed 12 grams and was a dark solid which was brittle but slightly flexible.

Example 7

This example describes a liquid polysilicate obtained by cross-linking tetraphenyl orthosilicate with a tert.-butylcatechol.

20 grams of tetraphenyl orthosilicate were mixed with 8.3 grams of tert.butylcatechol and reacted together as described in Example 1; 8.8 grams of by-product phenol were distilled off during the reaction. There were obtained 19.5 grams of a polysilicate which at room temperature was a slightly gelatinous clear liquid, and which was a mobile liquid at elevated temperatures.

Example 8

This example describes a polysilicate obtained by cross-linking phenyl triphenoxysilane with hydroquinone.

9.6 grams of phenyl triphenoxysilane (0.025 mol.) were heated with 2.75 grams of hydroquinone (0.025 mol.) as in Example 1 until 3.8 grams of by-product phenol had been removed. The resulting polysilicate (8.5 grams) was a mobile liquid at elevated temperatures and a very viscous one at room temperature.

What I claim is:

1. The product obtained by heating a dihydroxyphenol with a molar excess of tetraphenyl orthosilicate until the reaction is substantially complete.

2. A heat stable polysilicate derived by heating a mixture of one mol of a dihydroxyphenol with 1 to 10 mols of tetraphenyl orthosilicate in the presence of an esterification catalyst.

3. A heat stable polysilicate derived by heating a mixture of one mol of hydroquinone with 1 to 10 mols of tetraphenyl orthosilicate in the presence of an esterification catalyst.

4. A heat stable polysilicate derived by heating a mixture of one mol of resorcinol with 1 to 10 mols of tetraphenyl orthosilicate in the presence of an esterification catalyst.

5. A heat stable polysilicate derived by heating a mixture of one mol of catechol with 1 to 10 mols of tetraphenyl orthosilicate in the presence of an esterification catalyst.

6. A heat stable polysilicate derived by heating a mixture of one mol of t. butylcatechol with 1 to 10 mols of tetraphenyl orthosilicate in the presence of an esterification catalyst.

7. A heat stable polysilicate derived by heating a mixture of one mol of pyrogallol with 1 to 10 mols of tetraphenyl orthosilicate in the presence of an esterification catalyst.

8. A heat stable polysilicate derived by mixing one mol of a dihydroxyphenol with 1 to 10 mols of tetraphenyl ortho-silicate in the presence of an esterification catalyst, heating until the reaction is substantially complete.

9. A heat stable polysilicate derived by mixing one mol of hydroquinone with 1 to 10 mols of tetraphenyl orthosilicate in the presence of an esterification catalyst, heating until the reaction is substantially complete.

10. A heat stable polysilicate derived by mixing one mol of resorcinol with 1 to 10 mols of tetraphenyl orthosilicate in the presence of an esterification catalyst, heating until the reaction is substantially complete.

11. A heat stable polysilicate derived by mixing one mol of catechol with 1 to 10 mols of tetraphenyl orthosilicate in the presence of an esterification catalyst, heating until the reaction is substantially complete.

12. A heat stable polysilicate derived by mixing one mol of t. butylcatechol with 1 to 10 mols of tetraphenyl orthosilicate in the presence of an esterification catalyst, heating until the reaction is substantially complete..

13. A heat stable polysilicate derived by mixing one mol of pyrogallol with 1 to 10 mols of tetraphenyl orthosilicate in the presence of an esterification catalyst, heating until the reaction is substantially complete.

14. A method of preparing a heat stable polysilicate which comprises mixing a compound having the structure $$R'_n\text{—}Si(O\text{—}R)_{4-n}$$

wherein R and R' are organic radicals of the group consisting of aryl radicals, aralkyl radicals, and alkyl radicals having at least eight carbon atoms, and wherein $n$ is an integer from zero (0) to one (1) and a phenol having from 2 to 3 hydroxyl groups, and heating until the reaction is substantially complete.

15. A method of preparing a heat stable polysilicate which comprises mixing dihydroxyphenol and tetraphenyl orthosilicate, and heating in the presence of an esterification catalyst until the reaction is substantially complete.

16. A method of preparing a heat stable polysilicate which comprises mixing hydroquinone and tetraphenyl orthosilicate, and heating in the presence of an esterification catalyst until the reaction is substantially complete.

17. A method of preparing a heat stable polysilicate which comprises mixing resorcinol and tetraphenyl orthosilicate, and heating in the presence of an esterification catalyst until the reaction is substantially complete.

18. A method of preparing a heat stable polysilicate which comprises mixing catechol and tetraphenyl orthosilicate, and heating in the presence of an esterification catalyst until the reaction is substantially complete.

19. A method of preparing a heat stable polysilicate which comprises mixing t. butylcatechol and tetraphenyl orthosilicate, and heating in the presence of an esterification catalyst until the reaction is substantially complete.

20. A method of preparing a heat stable polysilicate which comprises mixing pyrogallol and tetraphenyl orthosilicate, and heating in the presence of an esterification catalyst until the reaction is substantially complete.

References Cited by the Examiner
UNITED STATES PATENTS

| | | | |
|---|---|---|---|
| 2,386,793 | 10/45 | Hanford | 260—448.8 |
| 2,406,671 | 8/46 | Diamond | 260—448.8 |
| 2,630,446 | 3/53 | Gresham | 260—448.8 |
| 2,724,698 | 11/55 | Kittleson | 260—448.8 |
| 2,755,269 | 7/56 | Moorhead | 260—46.5 |

FOREIGN PATENTS 1,118,776  3/56  France.

OTHER REFERENCES

Holzapfel "Kolloid Zeitschrift," vol. 100, No. 3, September 1942, pages 380–8.

Jacovic: "Zeitschrift fur Anorganische und Allgemeine Chemie," vol. 288 (January 1957), pages 324–32.

Schwarz et al.: "Zeitschrift fur Anorganische und Allgemeine Chemie," vol. 266 (1951), pages 185–92.

Volnov et al.: "Jour. Gen. Chem." USSR, vol. 10 (1940), pages 550–56 (Translation available in Div. 31, "Organosilicon Literature," vol. 4, Item 11).

TOBIAS E. LEVOW, *Primary Examiner.*

ALLAN M. BOETTCHER, ABRAHAM RIMENS, MILTON STERMAN, *Examiners.*